(12) United States Patent
Asai et al.

(10) Patent No.: US 7,679,868 B2
(45) Date of Patent: Mar. 16, 2010

(54) POWER SUPPLY APPARATUS

(75) Inventors: Kouichi Asai, Saitama (JP); Yoshinori Nakagawa, Saitama (JP); Tsutomu Hirano, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 279 days.

(21) Appl. No.: 11/008,568

(22) Filed: Dec. 10, 2004

(65) Prior Publication Data

US 2005/0152079 A1 Jul. 14, 2005

(30) Foreign Application Priority Data

Dec. 17, 2003 (JP) ............................. 2003-419791

(51) Int. Cl.
*H02H 3/00* (2006.01)
*H02H 9/08* (2006.01)
(52) U.S. Cl. ........................................................ 361/42
(58) Field of Classification Search .................. 361/42
See application file for complete search history.

(56) References Cited

U.S. PATENT DOCUMENTS 6,285,534 B1 * 9/2001 Gibson et al. .................. 361/42
6,469,881 B2 * 10/2002 Gershen et al. ................ 361/42
2002/0145838 A1 * 10/2002 Bonilla et al. .................. 361/42

FOREIGN PATENT DOCUMENTS

| JP | 2500838 | 3/1996 |
| JP | 9-97556 | 4/1997 |
| JP | 2576174 | 4/1998 |
| JP | 3135787 | 12/2000 |

* cited by examiner

*Primary Examiner*—Robert DeBeradinis
*Assistant Examiner*—Scott Bauer
(74) *Attorney, Agent, or Firm*—Westerman, Hattori, Daniels & Adrian, LLP

(57) ABSTRACT

A ground faulty interrupting function is returned to a normal standby state in a short time after a movable contact (8) tripped in detecting electrical leak is returned to a closed position. A tripping coil (10) which moves the contact (8) provided on an output line (2) to a shutdown position is included. A current transformer (12) is provided on a downstream of the contact (8). A circuit (20) energizes the coil (10) when the leak current are detected. A reset signal forming circuit (22) outputs a reset signal to the gate signal forming circuit (20) when the contact (8) is returned to a connection position. The circuit (20) obtains power from the upstream side of the contact (8). LED (16) is lit when the contact (8) is at the shutdown position, and LED (16) end display when the contact (8) is returned to the normal position.

3 Claims, 3 Drawing Sheets

POWER SUPPLY APPARATUS

BACKGROUND OF THE INVENTION

1. Field of the Invention

The present invention relates to a power supply apparatus with a ground fault interrupting function, particularly relates to the power supply apparatus which can immediately return the ground faulty interrupting function to a standby state after returning a movable contact moved to a power shutdown position to an original position when an electrical leak is detected.

2. Description of the Related Art

The power supply apparatus, such as an engine-drive generator, utilized for an outdoor portable power supply or an emergency power supply is used while connected to the ground as needed. When the power supply apparatus is used while connected to the ground, it is often necessary to attach a ground faulty interrupter to the power supply apparatus.

For example, the power supply apparatuses with the ground faulty interrupter or the ground faulty interrupting function are disclosed in Japanese Patent No. 3135787, Japanese Utility Model Registration No. 2576174, and Japanese Utility Model Registration No. 2500838. In the power supply apparatuses disclosed in the patent references, the movable contact for power shutdown is provided in an electric power line from a power supply portion to an output terminal, and the electric power line is shut down by moving or pulling apart the movable contact when the electrical leak is detected.

The conventional ground faulty interrupter or the conventional ground faulty interrupting function is attached as an option, i.e. an additional function, so that a zero-phase-sequence current transformer, a movable contact tripping coil, and a drive power supply unit for the movable contact tripping coil are provided on the downstream side of the movable contact. When the power supply is restarted, the movable contact is moved to a predetermined return position.

In order to display the state of the power shutdown, the power shutdown can be recognized from the outside by mechanically projecting an electrical leak display button according to the shutdown operation. Since the electrical leak button is mechanically projected, the display of the power shutdown is held until the state of the power shutdown is eliminated.

In the conventional apparatus, the movable contact performs the interrupting operation to shut down all the power supplies when the electrical leak is detected. Therefore, the movable contact and the electrical leak display button are returned by manpower, and the configuration of the apparatus becomes complicated.

Since the power is provided after the movable contact is returned to the original position, it takes time to restart the power supply apparatus. Namely, there is a problem in that the time is required to set the ground faulty interrupting function to the normal standby state since the movable contact is returned.

SUMMARY OF THE INVENTION

In view of the foregoing, an object of the present invention is to provide a power supply apparatus which can simplify the configuration and shorten the standby state in restarting the operation.

The first feature of the invention is that a power supply apparatus including a movable contact which is provided on an output line from a power supply unit to an output terminal for providing electric power to a load and shuts down the output line, a tripping coil which moves the movable contact to a shutdown position of the output line, and a manual operating unit which moves the movable contact from the shutdown position to a connection position to return the output line, the power supply apparatus comprising: an electrical leak detection current transformer which is provided on a side of the output terminal from the movable contact, a drive circuit which energizes the tripping coil for a predetermined time in order to move the movable contact to the shutdown position in response to an electrical leak current detection signal outputted from the current transformer, and a returning means for inputting a reset signal to the drive circuit when the movable contact is returned from the shutdown position to the connection position, wherein the drive circuit is powered by a power supply which is taken out on the side of the power supply unit from the movable contact.

The second feature of the invention is that a power supply apparatus according to claim 1, wherein the returning means outputs the reset signal when alternating voltage having a predetermined value rises in the output line.

The third feature of the invention is that a power supply apparatus according to claims 1 or 2, wherein the returning means is configured to be powered by a power which is taken out on the output terminal side from the movable contact, and a non-contact signal-transmission unit is provided on a signal transmission path in the returning means.

The fourth feature of the invention is that a power supply apparatus according to claim 1, comprising a light-emitting display element which performs display that the movable contact is located in the shutdown position on the basis of the electrical leak current detection signal, wherein the light-emitting display element is configured to end the display by resetting the drive circuit.

According to the first aspect of the invention, the power supply of the drive circuit is obtained on the upstream side of the movable contact, and the movable contact is moved to the power shutdown position for a predetermined time interval when the electrical leak current is detected. Therefore, even if the movable contact is shut down, the drive circuit is in the ready state, so that the drive circuit can immediately be transferred to the standby state after the movable contact is returned to the connection point.

According to the second aspect of the invention, after the movable point is returned, the interrupting operation can immediately be performed with respect to the electrical leak when a voltage is higher, and the interrupting operation can be performed during the electrical leak at the time when a voltage waveform passes slightly through a zero cross-point at the latest when the voltage is lower.

According to the third aspect of the invention, in the returning means which is powered with the power supply at the downstream side of the movable contact located at the shutdown position, a signal transmission path can electrically be insulated from the power supply unit side.

According to the fourth aspect of the invention, the power shutdown state of the movable contact can simply be displayed with a light-emission element such as LED.

DETAILED DESCRIPTION OF THE PREFERRED EMBODIMENTS

Figure 1:
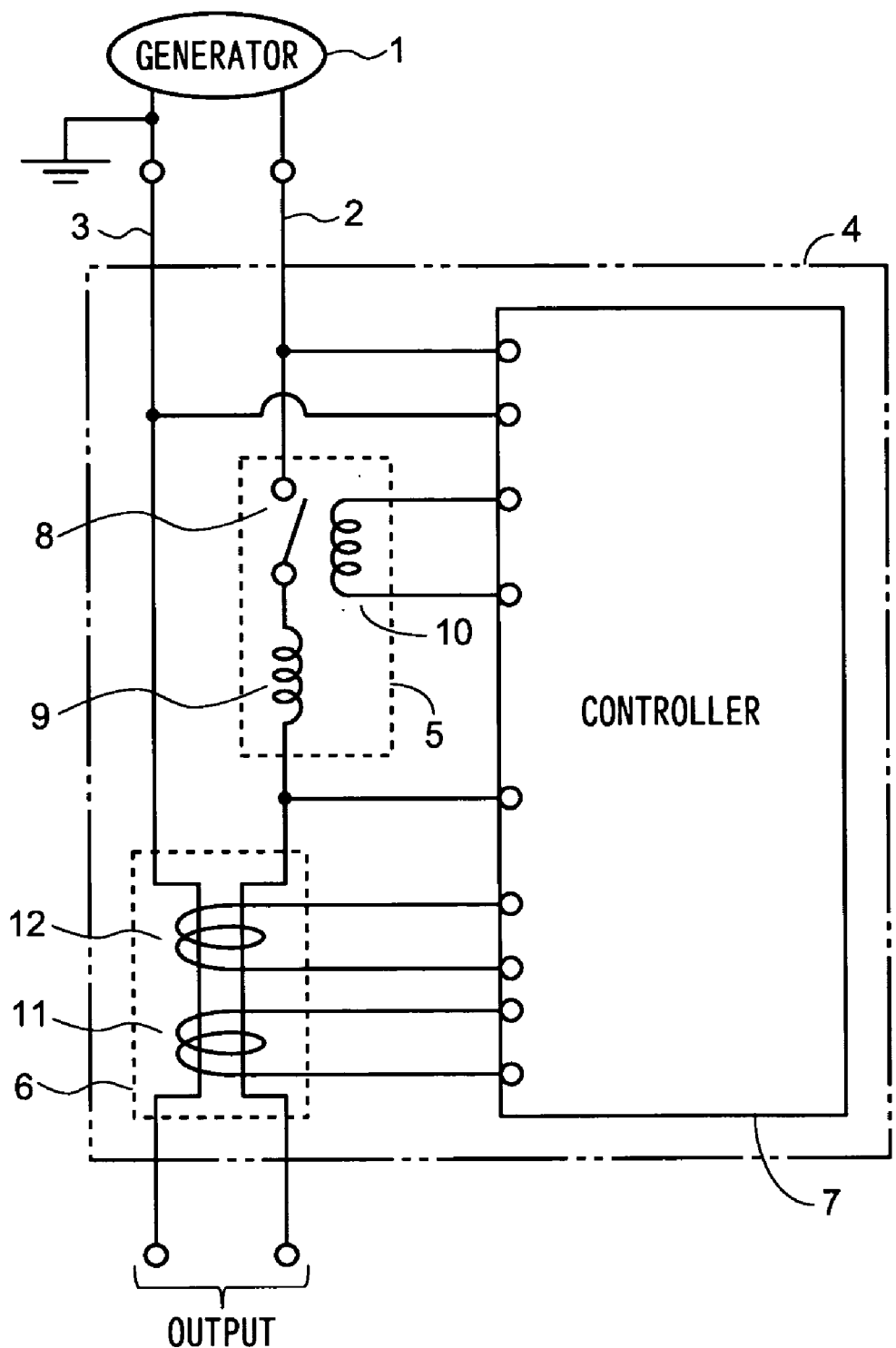
FIG. 1 shows a configuration of a power supply apparatus with a ground faulty interrupter according to an embodiment of the present invention.

Referring to the accompanying drawings, a preferred embodiment of the present invention will be described below. FIG. 1 shows a configuration of a power supply apparatus with a ground faulty interrupter according to the embodiment of the invention. The power supply apparatus includes a generator 1 which is driven by the power supply unit, i.e. the engine and the like and a ground faulty interrupter 4 provided in output lines 2 and 3. The generator 1 includes an inverter (not shown), and the inverter outputs alternating current controlled at a predetermined frequency to the output lines 2 and 3. The ground faulty interrupter 4 includes a circuit breaker 5 provided in at least one of output lines 2 and 3, a current detection unit 6, and a controller 7. The circuit breaker 5 includes a movable contact 8, a coil 9 which holds the movable contact 8 at a closed state, a tripping coil 10 which moves (pull apart) the movable contact 8 to an opened state when the electrical leak is detected, and an operating unit (not shown) which manually moves the movable contact 8 to the closed state. The current detection unit 6 includes an oscillation coil 11 and a zero-phase-sequence current transformer 12.

The movable contact 8 is biased to the opened state by a spring (not shown). However, once the movable contact 8 is moved to the closed state against the spring to make the connection by the manual operation, the current passes through the coil 9 and the movable contact 8 is held at the closed state, i.e. the connection position. When the tripping coil 10 is biased during the electrical leak, the movable contact 8 is moved to the opened state, i.e. the shutdown position. Once the movable contact 8 is moved to the shutdown position, the movable contact 8 is never returned to the connection position unless the movable contact 8 is moved to the connection position by the manual operation.

The oscillation coil 11 of the current detection unit 6 generates a magnetic flux when oscillation current is provided. When the electrical leak does not occur, the zero-phase-sequence current transformer 12 does not generate output voltage. On the other hand, when the electrical leak occurs, weak current passes through an electrical leak loop by the magnetic flux. As a result, the magnetic flux is generated in a core portion of the zero-phase-sequence current transformer 12 to induce the voltage in a coil portion of the zero-phase-sequence current transformer 12.

The controller 7 determined the presence or absence of the electrical leak on the basis of the voltage induced in the zero-phase-sequence current transformer 12 of the current detection unit 6. When the controller 7 detects the electrical leak, while the controller 7 passes the current through the tripping coil 10 only for a predetermined time to shut down the circuit breaker 5, the controller displays the state of the electrical-leak shutdown with the later-mentioned light-emitting diode. The controller 7 has the function of resetting the tripping coil 10 to the initial state when the movable contact 8 is returned from the pulling apart state to the normal connection position.

Figure 2:
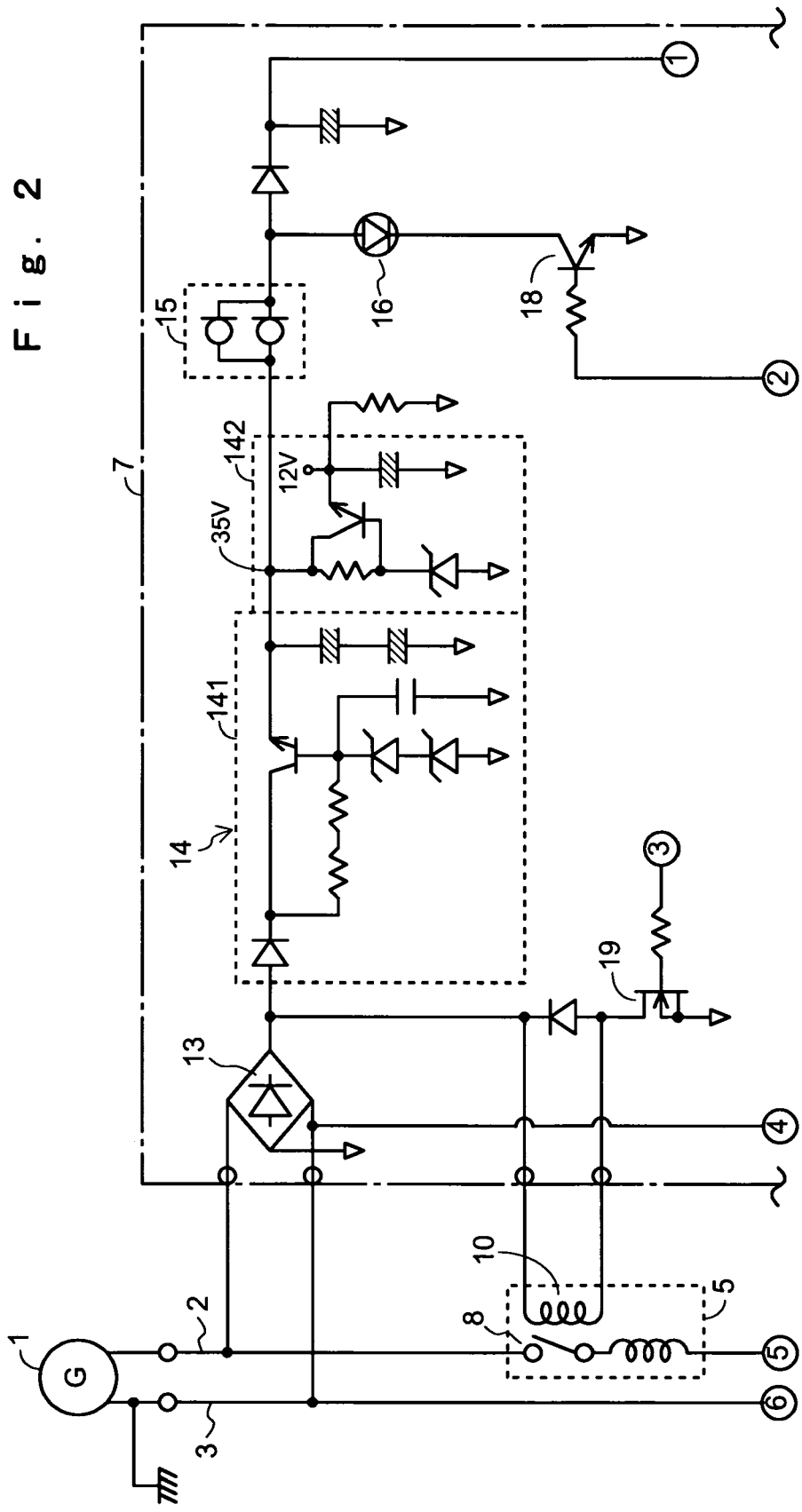
FIG. 2 is a circuit diagram showing a first part of a control device of the ground faulty interrupter.
Figure 3:
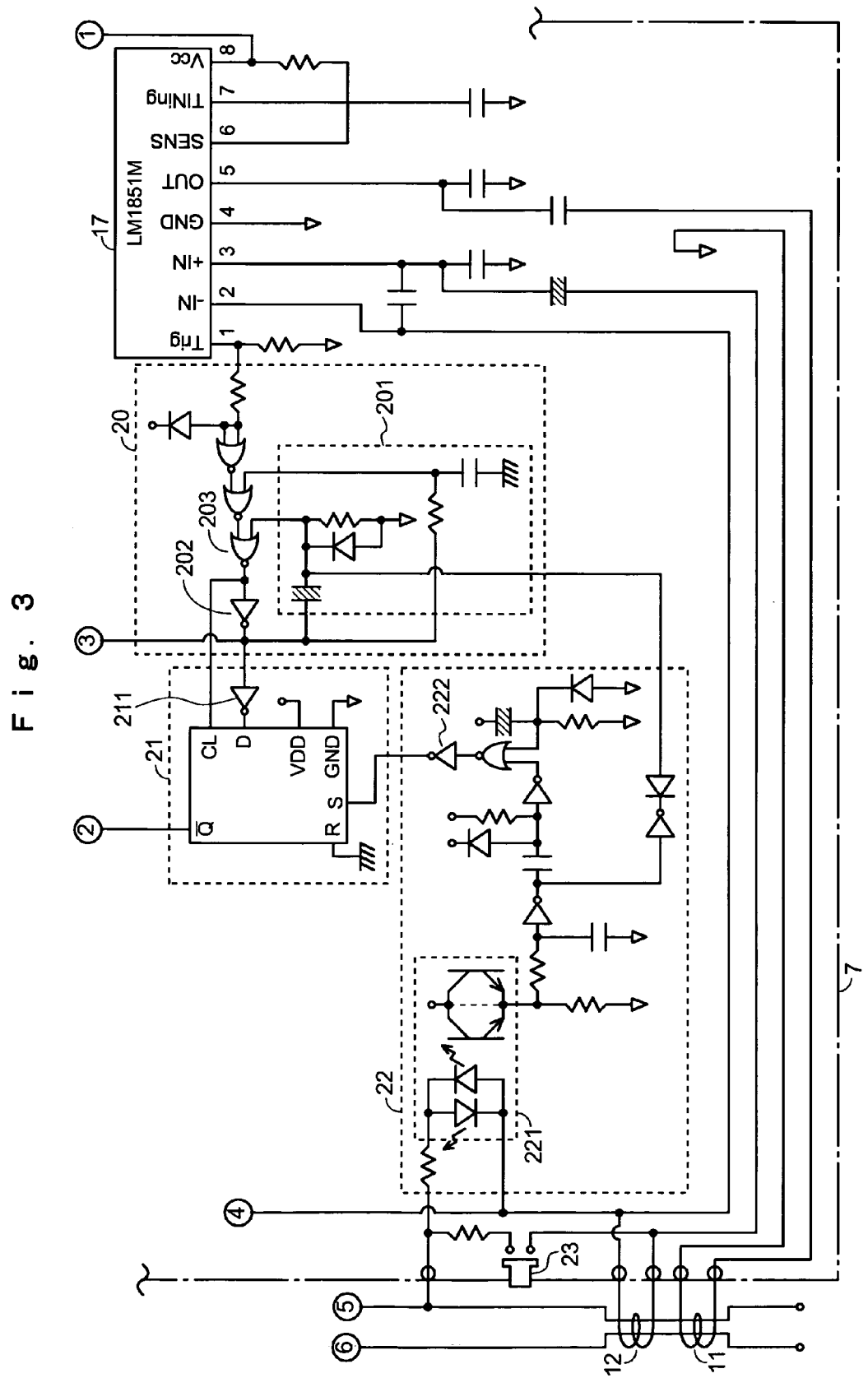
FIG. 3 is a circuit diagram showing a second part of a control device of the ground faulty interrupter.

Referring to FIGS. 2 and 3, the configuration and the action of the controller 7 will be described in detail. In FIG. 2, the output lines 2 and 3 of the generator 1 are connected to a full-wave rectifier 13, and an output side of the full-wave rectifier 13 is connected to a constant-voltage power supply circuit 14. The constant-voltage power supply circuit 14 includes a first power supply unit 141 which provides power (for example, 35 volts power) to the light-emitting diode 16 and a ground faulty interrupting circuit 17 (FIG. 3) and a second power supply unit 142 which provides the power (for example, 12 volts power) to other logic circuits.

The output of the first power supply unit 141 of the constant-voltage power supply circuit 14 is connected to a constant current circuit 15, and the first power supply unit 141 and the constant current circuit 15 form the power supply for the light-emitting diode 16 and the ground faulty interrupting circuit 17.

A cathode of the light-emitting diode 16 is connected to a collector of a transistor 18, and the later-mentioned LED drive circuit 21 provides a drive signal to a base of the transistor 18. The drive signal drives the light-emitting diode 16.

The output side of the full-wave rectifier 13 is connected to one end of the tripping coil 10, and the other end of the tripping coil 10 is connected to FET 19. When a gate signal is provided to a gate of FET 19, the tripping coil 10 is energized to open the movable contact 8.

In FIG. 3 the ground faulty interrupting circuit 17 has both oscillation function of providing the oscillation current to the oscillation coil 11 and electrical leak detection function of detecting the output voltage of the zero-phase-sequence current transformer 12 to generate an electrical leak detection signal (trigger). It is possible that the ground faulty interrupting circuit 17 is formed by IC.

The trigger outputted from the ground faulty interrupting circuit 17 is inputted to a gate signal forming circuit 20. The gate signal forming circuit 20 has a timer circuit 201, and the gate signal forming circuit 20 causes the signal which has risen by the trigger to fall after a predetermined time (for example, 50 msec) elapses. Namely, the output of a NOT logic circuit 202 of the gate signal forming circuit 20 becomes the gate signal. The gate signal rises in response to the trigger, and the gate signal falls to a low after held at a high only for the predetermined time determined by the timer circuit 201. The gate signal is provided to the gate of FET 19 (FIG. 2), and FET 19 is held at an on state while the gate signal is in the high level.

The gate signal outputted from the NOT logic circuit 202 is inversed by a NOT logic circuit 211, and the gate signal is provided to a data input terminal (D) of the LED drive circuit (D-type flip-flop) 21. The output of a NOR logic circuit 203 of the gate signal forming circuit 20 is connected to a clock input terminal (CL) of the LED drive circuit 21. An inverted output Q terminal of the LED drive circuit 21 generates the output depending on a data input level which is latched in a rising edge of a clock input. The inverted output Q of the LED drive circuit 21 is provided to the base of the transistor 18, the transistor 18 is driven while the inverted output Q level is in the high level, and the light-emitting diode 16 is turned on. At this point, the supply of the power to the ground faulty interrupting circuit 17 is decreased, and the action of the ground faulty interrupting circuit 17 is stopped.

A reset signal forming circuit 22 for the LED drive circuit 21 is provided. The power supply of the reset signal forming circuit 22 is taken between the circuit breaker 5 and the current detection unit 6. The reset signal forming circuit 22 is connected to the output line 2 through a photocoupler 221 which is of a non-contact signal-transmission unit. Therefore, the output line 2 is electrically insulated from the reset signal forming circuit 22. The output of the reset signal forming circuit 22, i.e. the output of a NOT logic circuit 222 is connected to a set input terminal (S) of the LED drive circuit 21. When the output line 2 is not shut down, the output of the NOT logic circuit 222 is in the high level. When the output line 2 is shut down, the output of the NOT logic circuit 222 is in the low level. Namely, the reset signal forming circuit 22 resets the LED drive circuit 21 when the movable contact 8 is returned from the shutdown position to the normal connection position. Therefore, the inverted output Q becomes the low level. The ground faulty interrupting circuit 17 and the gate signal forming circuit 20 which are of the drive circuit of the tripping coil 10 are indirectly reset. Thus, the reset signal forming circuit 22 has the function as the returning means.

A button 23 for testing the ground faulty interrupter 4 is provided. The button 23 is a switch which connects the output line 2 and the zero-phase-sequence current transformer 12, and the button 23 is in the opened state at the normal condition.

When the output line 2 is not shut down, the LED drive circuit 21 is reset by the output of the zero-phase-sequence current transformer 12, and the inverted output Q is in the low level, so that the light-emitting diode 16 is not turned on. The ground faulty interrupting circuit 17 monitors the electrical leak. When the ground faulty interrupting circuit 17 detects the electrical leak by the output of the zero-phase-sequence current transformer 12, the ground faulty interrupting circuit 17 outputs the trigger, and the gate signal is outputted only for the predetermined time determined by the timer circuit 201. Therefore, the FET 19 is turned, and the tripping coil 10 is energized to shut down the output line 2. At the same time, the LED drive circuit 21 is activated, and the transistor 18 is turned on to light the light-emitting diode 16. The light-emitting diode 16 displays the shutdown state of the output line 2 on the basis of the electrical leak.

When the movable contact 8 is returned to the connection state, the electric power is immediately provided to the reset signal forming circuit 22 in the case where the voltage values of the output lines 2 and 3 are higher. Even in the case where the voltage values are lower, the electric power is provided to the reset signal forming circuit 22 at the time when the photocoupler 221 detects the alternating current output of the generator 1, i.e. at the time when the voltage waveform passes slightly through the zero cross-point. Therefore, the reset signal forming circuit 22 resets the LED drive circuit 21 at the time without any trouble, and the transistor 18 is turned off to switch off the light-emitting diode 16, which provides the power to the ground faulty interrupting circuit 17 to return the ground faulty interrupting circuit 17 to the standby state of the electrical leak detection.

As described above, in the embodiment, since the power of the controller 7 is obtained on the upstream side of the movable contact 8, even after the electrical leak is detected to move the movable contact 8 to the shutdown position, the controller 7 is held at the state in which the power is provided.

Therefore, when the movable contact 9 is returned to the normal position, the ground faulty interrupting circuit 17 can immediately be returned to the standby state.

What is claimed is:

1. A power supply apparatus including a single movable contact which is provided on an output line from a power supply unit to an output terminal for providing electric power to a load and shuts down the output line, a tripping coil which moves the single movable contact to a shutdown position of the output line, and a manual operating unit which directly manually moves the single movable contact from the shutdown position to a connection position, the power supply apparatus comprising:

an electrical leak detection current transformer which is provided on a side of the output terminal from the single movable contact;

a drive circuit which energizes the tripping coil for a predetermined time in order to move the single movable contact to the shutdown position in response to an electrical leak current detection signal outputted from the current transformer;

a returning means for inputting a reset signal to the drive circuit when the single movable contact is directly manually returned from the shutdown position to the connection position, said returning means is configured to be powered by a power from said power supply unit which is taken out on the output terminal of the single movable contact side located upstream from said electrical leak detection current transformer, and a non-contact signal-transmission unit is provided on a signal transmission path of the returning means to electrically insulate said signal transmission path from said power supply unit, wherein the drive circuit is powered by a power supply which is taken out on the side of the power supply unit upstream from the single movable contact.

2. A power supply apparatus according to claim 1, wherein the returning means outputs the reset signal when alternating voltage having a predetermined value rises in the output line.

3. A power supply apparatus according to claim 1, comprising a light-emitting display element which performs display that the single movable contact is located in the shutdown position on the basis of the electrical leak current detection signal, wherein the light-emitting display element is configured to end the display by resetting the drive circuit.

* * * * *